United States Patent [19]

Dufresne

[11] 4,168,925
[45] Sep. 25, 1979

[54] DEVICE FOR BORING OUT TUBES WITH COOLANT LIQUID INJECTION

[75] Inventor: Yves J. Dufresne, Sarcelles, France

[73] Assignee: Cri-Dan, Paris, France

[21] Appl. No.: 892,696

[22] Filed: Apr. 3, 1978

[30] Foreign Application Priority Data

Apr. 25, 1977 [FR] France ................................ 77 12377

[51] Int. Cl.² ............................................. B23B 51/06
[52] U.S. Cl. ...................................... 408/59; 175/213
[58] Field of Search ........................... 408/59, 57, 60; 175/213; 90/11 A

[56] References Cited

U.S. PATENT DOCUMENTS 3,199,382  8/1965  Andreasson ........................... 408/59
4,032,250  6/1977  Lavallee ............................... 408/59

FOREIGN PATENT DOCUMENTS 647615 10/1962 Italy ......................................... 408/59

Primary Examiner—Gil Weidenfeld
Attorney, Agent, or Firm—Anthony J. Casella

[57] ABSTRACT

A device for boring out tubes, comprising a boring bar with cutting tools on its periphery and an axial channel for coolant liquid injection communicating with radial injection ducts emerging in front of said tools.

The boring bar is provided at its end with a fixed cover whose outer diameter is less than the inner diameter of the rough tube to be machined, this cover being provided with a peripheral flange directed towards the tools and which is located at the level of the radial injection ducts.

Application : for machining tubes in the oil industry.

3 Claims, 1 Drawing Figure

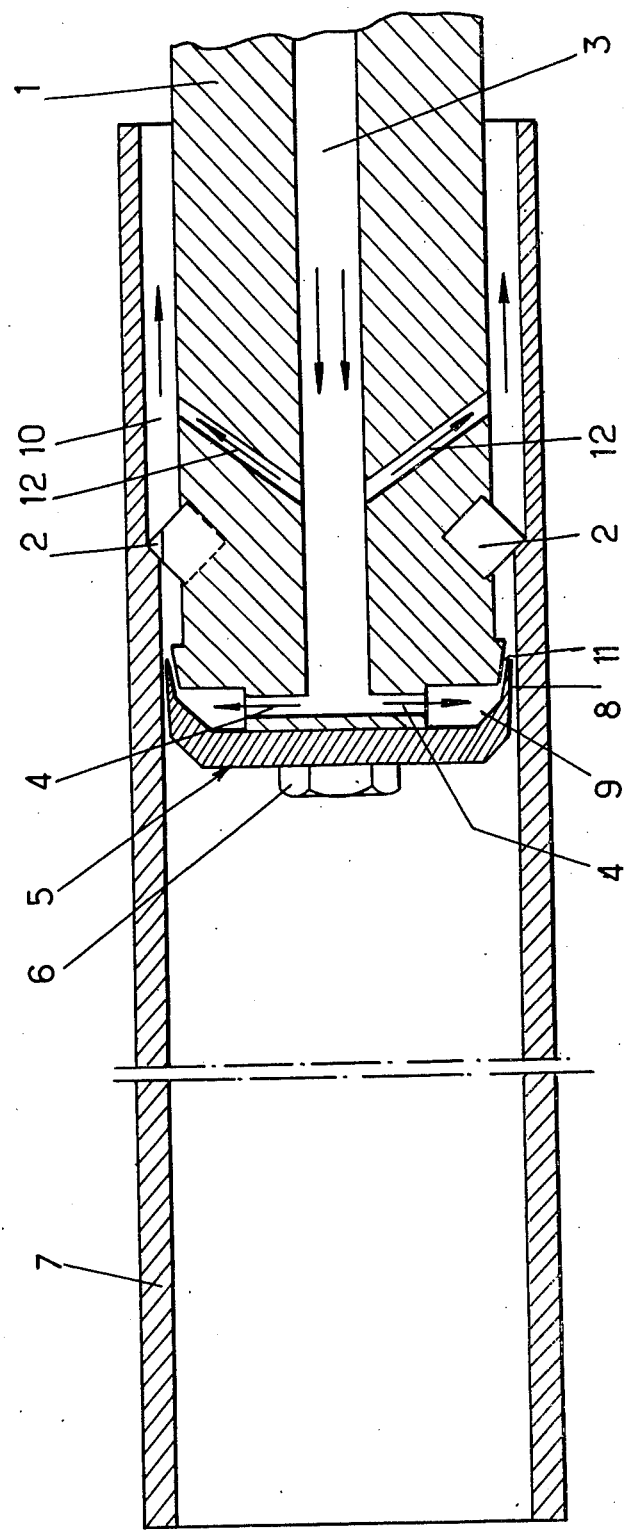

DEVICE FOR BORING OUT TUBES WITH COOLANT LIQUID INJECTION

The present invention concerns a device for boring out tubes, and particularly tubes used in the oil industry which must be machined in the bore at their ends.

It is known that to achieve such an inner machining is an expensive operation, the conditions being only moderate if liquid coolants in sufficient quantity cannot be injected at the level of the cutting tools. It is known moreover that the cutting performances increase with the pressure of the coolant liquid.

Now, the injection of large quantities of coolant liquid in tubes of great length pose numerous problems, the liquid injected flowing freely through the two ends of the tube at one and the same time and thus preventing its pressurisation.

Stopping the end opposite that where the machining takes place, by means of a plug, has already been thought of, but the placing of such a plug is complicated by the rough bore of the tube and cannot therefore be carried out in simple and rapid conditions, which greatly increases the time necessary for executing the products.

Another known solution consists of introducing a movable plug in front of the system for sprinkling the tools with coolant liquid, but the presence of the rough tube and the need to provide a relative rotation of the plug with respect to the cutting tools means that such a solution is in the end difficult to use in practice.

The present invention has then for its principal aim to remedy these disadvantages and, to do this, it has as objective a device for boring out tubes comprising a boring bar with cutting tools on its periphery and a coolant liquid injection axial channel communicating with radial ejection ducts emerging in front of said tools, which is characterised essentially in that the boring bar is provided at its end with a fixed cover whose outer diameter is less than the inner diameter of the rough tube to be machined, this cover being provided with a peripheral flange directed towards the tools and which is located at the level of the radial injection ducts.

Thus, in spite of the absence of sealing between the tube and the cover, the coolant liquid is projected rearwards towards the tools under a certain pressure and, consequently, ensures efficient cooling thereof. It will furthermore be noted that the flow of coolant liquid thus created ensures the discharge of the metal cuttings towards the outside.

Preferably, the cover forms with the boring bar an annular chamber in which emerge the radial ducts and which communicates with the annular space of the tools only through a relatively narrow passage, which permits the speed of the coolant liquid flow to be again increased.

Furthermore, the boring bar comprises additional coolant liquid ejection ducts emerging behind the cutting tools, these additional ducts being inclined in relation to the axis and rearwardly, so as to promote the discharge of the metal cuttings outwardly of the tube.

An embodiment of the invention is described hereafter by way of example, with reference to the accompanying drawing in which the single FIGURE is a simplified sectional view of a boring out device in accordance with the invention, in action inside a tube.

This device comprises essentially a boring bar 1 of a known type, provided on its periphery with a number of cutting tools 2. It is in addition provided at its centre with an axial channel 3 for the injection of coolant liquid, generally formed simply by water, which communicates with radial ejection ducts 4 emerging in front of tools 2.

In accordance with the invention, the boring bar 1 is provided at its front end with a cover 5 fixed by means of a bolt 6 and whose outer diameter is less than the inner diameter of the rough tube to be machined 7. Moreover, this cover comprises a peripheral flange 8 directed towards tools 2 and which is located precisely at the level of the radial ducts 4. The cover 5 thus forms with the boring bar 1 an annular chamber 9 in which emerge radial channels 4 and which communicates with annular space 10 in which are located tools 2 only through a narrow passage 11, also annular.

It will be readily understood that owing to this arrangement, and in spite of the lack of sealing between cover 5 and tube 7, the coolant liquid injected by channel 3 is projected with force on to tools 2 and allows a suitable pressure to be maintained in space 10 for the efficient cooling of said tools. Their productivity is then increased thereby in large proportions.

It should furthermore be noted that as the flow direction of the liquid is in the opposite direction to the tool feed, there is created a current which carries along with it the metal cuttings resulting from the cutting operation towards the outside of the tube, as shown by arrows in the FIGURE, while maintaining a continuous curtain of liquid which prevents this latter from flowing through the opposite end of the tube. This carrying away of the metal cuttings is moreover further improved by the presence of additional injection ducts 12, emerging behind the tools and which are inclined in relation to the axis in the suitable direction, as shown in the FIGURE, so as to increase the flow speed of the coolant liquid.

What is claimed is:

1. A boring device for boring out rough tubes comprising:
    a boring bar, having a diameter less than the rough tube to be bored, and having a forward cutting end, and a plurality of cutting tools disposed around the periphery of said boring bar and to the rear of said forward cutting end, and wherein the total diameter of said boring bar and said cutting tools is greater than the diameter of said rough tube, said boring bar having an axial channel, for the injection of coolant liquid, and a plurality of radial ejection ducts communicating with said axial channel and emerging adjacent said forward cutting end; and
    a cover affixed to said forward cutting end having a diameter which is greater than the diameter of said boring bar and less than the diameter of said rough tube, said cover having a peripheral flange directed towards said cutting tools and cooperating with said radial ejection ducts, such that the coolant liquid is channeled rearwardly towards said cutting tools to provide cooling and a rearward discharge of metal cuttings.

2. A device for boring out tubes as recited in claim 1 wherein said peripheral flange of said cover, cooperates with said radial ejection ducts to form a narrowed annular chamber such that the velocity of the ejected coolant liquid is increased to facilitate the cooling of said cutting tools.

3. A device for boring out tubes according to claim 1 or 2, wherein said boring bar includes a plurality of secondary coolant liquid ejection ducts, communicating with said axial channel and emerging to the rear of said cutting tools, said secondary ejection ducts being inclined rearwardly in relation to the axis of said boring bar to facilitate the discharge of metal cuttings.

* * * * *